United States Patent Office 3,279,261
Patented Oct. 18, 1966

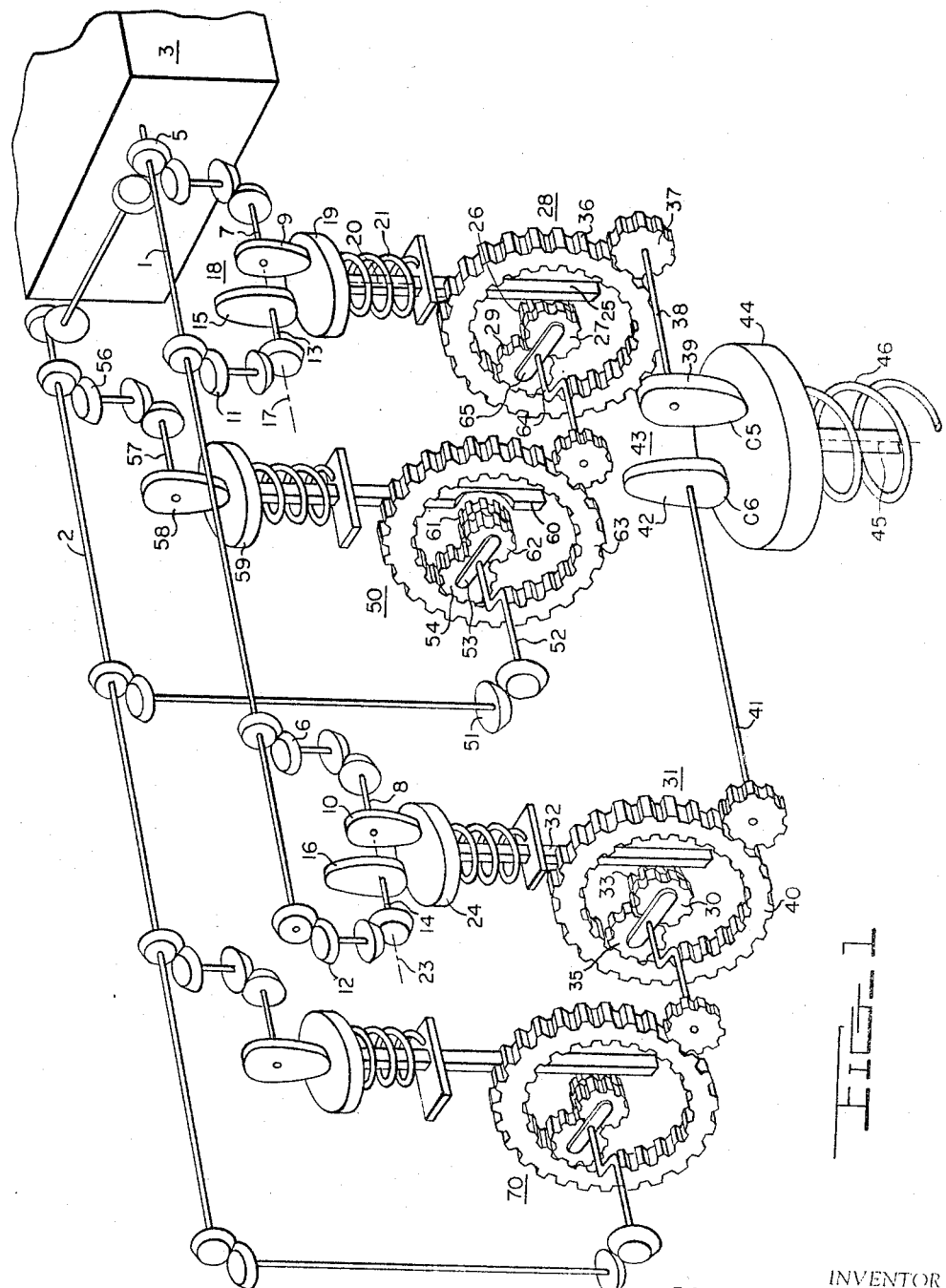

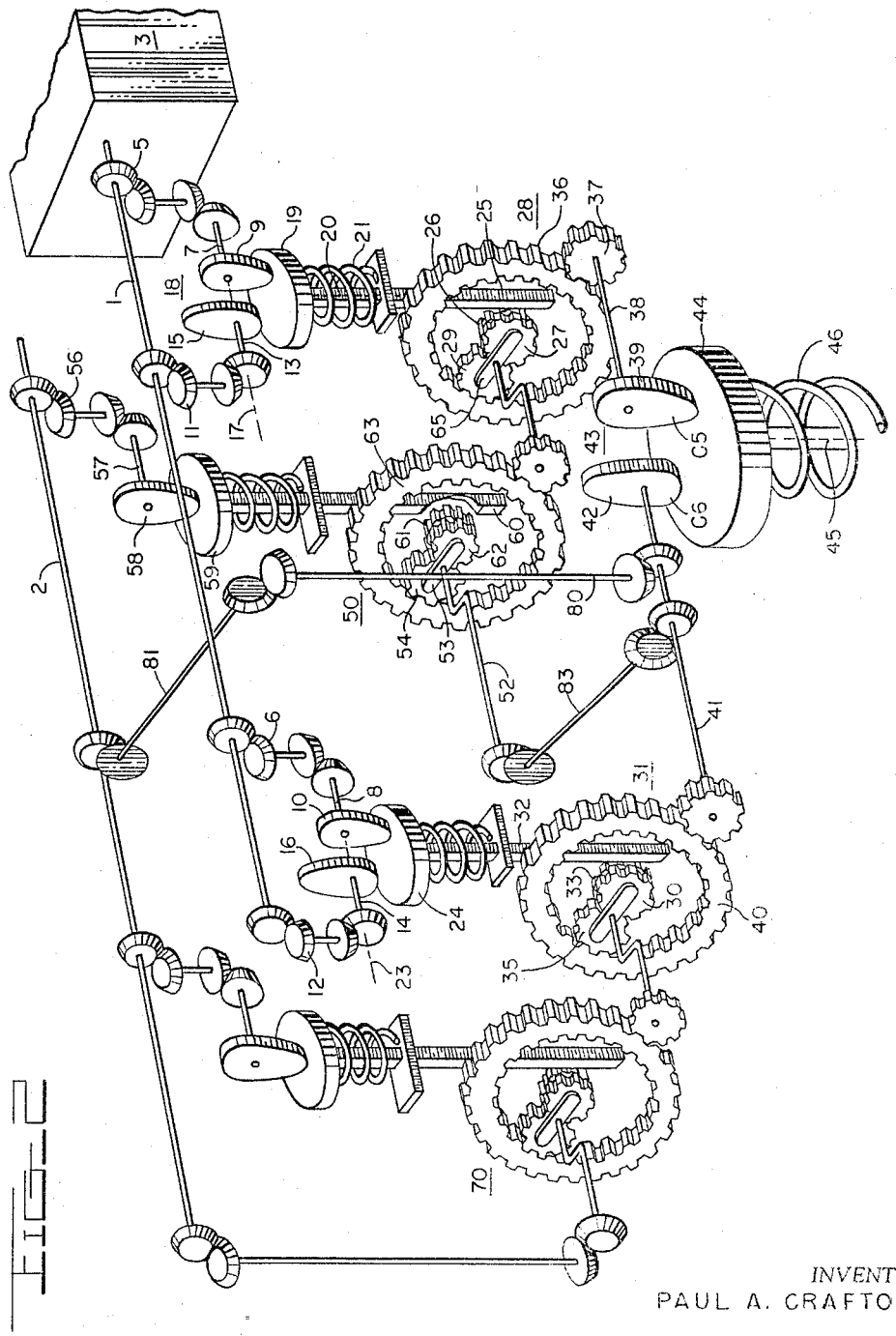

3,279,261
RANDOM MOTION GENERATOR
Paul A. Crafton, Washington, D.C., assignor to the United States of America as represented by the Secretary of the Navy
Filed Apr. 10, 1951, Ser. No. 220,323
8 Claims. (Cl. 74—1)

This invention relates to a mechanical random motion generator, and more particularly to a generator for producing mechanical motion in a pattern having an extremely long period, so that the mechanical motion is for all practical purposes aperiodic.

Such random mechanical motion may have particular utility in the cryptographic art, where for example it may serve to control the variation of a pattern of code signals, and render such variation so non-recurrent or aperiodic in nature that it will be very difficult to compromise.

One object of this invention is to provide a device of the class described for converting periodic mechanical motion to substantially aperiodic mechanical motion.

Another object is to provide a mechanism of the class described whereby the regular and periodic motion of a driving element may be converted into extremely irregular motion of a driven element, the motion of the driven element having a pattern of such long periodicity that for all practical purposes it is aperiodic, and hence may be defined as random.

Other objects and features of the present invention will appear more fully hereinafter from the following detailed description considered in connection with the accompanying drawing which discloses one embodiment of the invention. It is expressly understood, however, that the drawing is designed for purposes of illustration only, and not as a definition of the limits of the invention, reference for the latter purpose being had to the appended claims.

In the drawings, FIGURE 1 is a perspective schematic diagram of a mechanical apparatus constructed in accordance with the present invention.

FIGURE 2 is a modification of the apparatus shown in FIGURE 1.

The invention contemplates the provision of a plurality of cam assemblies and differential gear assemblies by means of which a uniform periodic mechanical input motion is successively modulated and thereby converted to motion which is increasingly irregular and unpredictable. The successive modulations are produced in a number of motion combining stages, progressively connected in a cascade arrangement. In each of the stages a plurality of input motions are combined to produce a lesser number of output motions, which in turn provide the source of input motion for the next succedent stage. The input motions for the first motion combining stage are derived from the periodic motion source. In each motion combining stage all of the input motions are converted to motions of an irrgular character by component cams, so that the output motions produced by their combination acquire an increasingly irregular character from stage to stage. The effect of the plurality of successive modulations of the periodic input motion is to produce a pattern of final output motion characterized by a mechanical displacement which is an extremely complex function of time. To motion of this character the term "random" is herein applied. The pattern of the output motion eventually is repeated, and this motion is therefore theoretically cyclical or periodic in nature. However, the time required to complete one whole pattern of the output motion, before a repetition of the pattern begins, is so long relative to the period of one cycle of the initial periodic input motion that for all practical purposes the output motion may be termed non-recurrent or aperiodic.

Referring now to FIG. 1, there is shown a mechanical motion generator of the type above described, having for its component parts eight profile cams of different shape, five cam followers each of which describes a rectilinear motion determined by the cams, and four epicyclic gear trains, each of which combines two motions to produce a third motion.

The motion generator depicted has inputs shafts 1 and 2 rotated at equal and constant speed by a suitable source of uniform periodic mechanical motion such as a synchronous electric motor or a spring clock movement 3. Driven by the input shaft 1 through respective gear trains 5 and 6 are cam shafts 7 and 8 carrying profile cams 9 and 10, respectively. Also driven by the input shaft 1 through similar gear trains 11 and 12 are cam shafts 13 and 14 carrying cams 15 and 16. Cams 9, 10, 15 and 16 are irregular in shape and are cut so that no two have the same shape. Also gear trains 5, 6, 11 and 12 are designed so that no two have the same ratio.

Camshafts 7 and 13 have a common axis 17. Cams 9 and 15 are mounted in adjacent relationship for rotation about this common axis 17, though they rotate at different angular velocities. These two cams 9 and 15 together constitute a cam assembly 18, and actuate a common cam follower 19. Cam follower 19 is mounted for rectilinear motion in a line of action 20, and is biased by spring 21 into contact with cam assembly 18. The line of action 20 corresponds to the direction of the force exerted by the cams on the follower. It will be apparent from the fact that cams 9 and 15 are of irregular shape and rotate at different angular velocities that cam follower 19 is instantaneously reciprocated by whichever of the cams 9 or 15 has the largest instantaneous radial dimension in the line of action 20 of the cam follower. Thus cam follower 19 is actuated by either cam 9 or cam 15, but not both simultaneously, and the resultant motion of the cam follower will be highly irregular in nature.

Cams 10 an 16 are mounted, like cams 9 and 15, in adjacent relation for rotation at different angular velocities about the common axis 23 of camshafts 8 and 14. These two cams 10 and 16 actuate a common follower 24 in the same manner as follower 19 is actuated.

Follower 19 is connected through a rack 25 and pinion drive 26 to control the rotation of one of the input gears 27 of a differential gear mechanism 28, shown in the drawings as of the epicyclic type. The driving source for the other input gear 29 of the gear mechanism 28 will be described hereinafter.

In a similar fashion input gear 30 of differential gear mechanism 31 is driven by follower 24 through rack 32 and pinion 33, while input gear 35 is driven from a source to be described hereinafter.

The output gear 36 of gear mechanism 28 is connected through gear 37 to camshaft 38 carrying profile cam 39. Likewise, output gear 40 of gear mechanism 31 drives camshaft 41 carrying profile cam 42. Shafts 38 and 41 are arranged in coaxial relationship and are so disposed that cams 39 and 42 are mounted in adjacent relationship, in a fashion similar to cams 9, 15 and 10, 16. Like cams 9, 10, 15 and 16, cams 39 and 42 have different and irregular shapes. Together cams 39 and 42 constitute another cam assembly 43, for actuating a common cam follower 44. As shown in the drawing follower 44 is mounted for rectilinear motion along axis 45 responsive to the action of cam assembly 43, with which it is held in contact by biasing spring 46.

The driving source for input gear 29 of differential gear mechanism 28 will now be described. This driving source consists of a differential gear mechanism 50 which derives its input through two separate paths. One path consists of a connection from the driving motor 3, through gear train 51, crank 52 and link 53 to input gear 54, which thus rotates at constant angular velocity. The other path consists of a connection from motor 3 through gear train 56 to camshaft 57 and thence to profile cam 58. Cam 58 is of irregular shape and actuates a spring loaded reciprocating follower 59, which in turn provides a driving connection, through rack 60 and pinion 61 to the other input gear 62. Input gear 62 thus rotates in an irregular fashion due to the irregular shape of cam 58. The rotation of input gear 62 is combined with the rotation of input gear 54 to produce a resultant rotation of the output gear 63 of differential gear mechanism 50. This rotation of output gear 63 is coupled through crank 64 and link 65 to input gear 29.

Referring to FIG. 2, the motion of camshaft 41 is shown coupled back through shafts 80 and 81 to shaft 2, the latter not receiving input motion from driving motor 3 as it is shown doing in FIG. 1. The motion of camshaft 41 also is coupled back through shaft 83 to crank 52 thereby replacing gear train 51, shown in FIG. 1, as the source of input motion to crank 52.

Input gear 35 of differential gear mechanism 31 is driven from shaft 2 through a differential gear mechanism 70 in the same manner as gear 29 is driven by differential gear mechanism 50. The details of such a drive have been explained hereinbefore, so that repetition is unnecessary.

The operation of the apparatus above described will now be explained. In the differential gear mechanism 50, the irregular rotation of input gear 62, produced by the irregular linear velocity of cam follower 59 through rack 60 and pinion 61, is combined with the constant velocity rotation of input gear 54. This combination of the constant with the irregular or variable velocity in effect produces a modulation of the constant angular velocity of gear 54 by the irregular angular velocity of gear 62. The result is an irregular angular velocity in the rotation of output gear 63 of differential gear mechanism 50.

As explained above this irregular rotation of output gear 63 is coupled to input gear 29 in differential gear mechanism 28. There it is combined with the highly irregular rotation of input gear 27 derived from the irregular rectilinear motion of cam follower 19. The resultant angular velocity of output gear 36 is twice modulated and therefore is extremely irregular in nature. This output motion is connected through gear 37 to camshaft 38, and thence to cam 39, which therefore acquires an equally irregular angular velocity.

By a like analysis it may be seen that the angular velocity of cam 42, derived from the twice modulated angular velocity of output gear 40 of differential gear mechanism 31, is irregular to an equal degree as that of cam 39.

It will be apparent from the fact that cams 39 and 42 are of irregular and different shape, and rotate at different and unrelated angular velocities about their respective camshafts, that follower 44, like followers 19 and 24, is instantaneously actuated by whichever of the cams 39 or 42 has the largest instantaneous radial dimension in the line of action 45 of the follower. Since the variable linear velocity of the common follower 44 of cams 39 and 42 is determined instantaneously by whichever of these cams has the greater cam radius, it is extremely difficult to predict the velocity or pattern of movement of follower 44. The pattern of this output motion cannot be predicted, for example, by isolating sections of the mechanism and determining the characteristics of the motion produced by each section, because the output motion is not determined by all parts of the mechanism at any given instant of time.

The random mechanical motion thus generated in follower 44 has the advantage of being virtually impossible to compromise without actual possession of the exact gears and cams of which the device is comprised, and a knowledge of their exact orientation in the whole device. In this connection it should be observed that all cams can be made interchangeable, to permit the generation of many different patterns of output motion.

It should be understood, of course, that the random motion generator above described, whose output is manifested by the random reciprocal motion of follower 44, may itself constitute only a portion of a larger system. In such a system, irregular output motions from any number of such cam assemblies as above described may be progressively combined in successive stages, in the pyramid fashion depicted, to produce an ultimate output motion which is unpredictable to an extremely high degree. Also, while the output motion of follower 44 as above described is a mechanical displacement as a complex function of time, naturally, higher time derivatives of the random output motion, such as acceleration, can also be utilized if preferred.

It will be appreciated that coupling back the random motion of shafts such as 38 and 41 to precedent shafts will render compromise by mathematical prediction even more difficult than would be the case without such coupling back. Coupling back usually necessitates detaching the shafts joined thereby from input motion from another source although if desired it is possible to combine the two motions via such means as differential gear mechanisms 28 and 50 in the figures.

Thus it may be seen that there has been shown and described a mechanical random motion generator adapted to convert periodic input motion to output motion which is characterized by a displacement which is such a complex function of time, and by a pattern of such long recurrence period, that the output motion is for all practical purposes random in nature, and impossible to predict.

Although only one embodiment of the present invention has been disclosed and described herein, it is expressly understood that various changes and substitutions may be made therein without departing from the spirit of the invention as well understood by those skilled in the art. Reference therefore should be had to the appended claims for a definition of the limits of the invention.

The invention described herein may be manufactured and used by or for the Government of the United States of America for Governmental purposes without the payment of any royalties thereon or thereof.

What is claimed:

1. Means for deriving a random mechanical output motion from a periodic mechanical input motion comprising a source of periodic motion; a plurality of cam assemblies; each of said cam assemblies including a plurality of profile cams mounted for rotation about a plurality of respective camshafts, means supporting said camshafts for rotation about a common axis, a cam follower common to said plurality of cams, and means supporting said cam follower in cooperative relation with said cams for instantaneous actuation by whichever of said cams has the largest instantaneous radius between said follower and said common axis; respective gear trains connecting each of the respective camshafts of said cam assemblies to said driving source for rotating each of said cams at a different angular velocity; a plurality of differential motion combining means each including a plurality of input elements and an output element; respective motion transmitting means connecting said input elements in driving relation with said respective cam followers; and means combining the motion of the output elements of said differential motion combining means to produce said output motion.

2. Motion converting and transmitting means comprising a plurality of motion combining stages connected sequentially; a selected number of said stages having a plurality of input elements adapted to be driven by the respective output elements of the next precedent stage, the remainder of said stages having input elements deriving motion from a common source, a lesser number of output elements than input elements, and motion combining means for combining the motion of said plurality of input elements to produce output motions for said output elements; and output means connected in driving relation with the output element of the least of said motion combining stages.

3. Apparatus as defined in claim 2, wherein each of said motion combining means includes a cam assembly; said cam assembly comprising a plurality of profile cams mounted for rotation on a plurality of respective camshafts, means supporting said camshafts for rotation about a common axis, a cam follower common to said plurality of cams, and means supporting said cam follower in cooperative relation with said cams for instantaneous actuation by whichever of said cams has the largest instantaneous radius between said follower and said common axis; motion transmitting means connecting each of said respective cams for rotation by a respective input element of said motion combining stage; and means connecting said cam follower in driving relation with an output element of said motion combining stage.

4. Motion converting and transmitting means comprising a plurality of motion combining stages connected sequentially; each of said stages having a plurality of input elements adapted to be driven by the respective output elements of the next precedent stage, a lesser number of output elements than input elements, and motion combining means for combining the motion of said plurality of input elements to produce output motions for said output elements; means connecting all of the input elements of the first of said motion combining stages to a source of motion; motion transferring means connecting an output element of at least one of said stages in driving relation with an input element in a stage precedent to said one of said stages; and output means connected in driving relation with the output element of the last of said motion combining stages.

5. Means for converting periodic mechanical motion to substantially aperiodic mechanical motion comprising a source of periodic motion, a plurality of input elements adapted to be driven by said source, means for converting the periodic motions of some of said input elements to irregular motions, means for combining the periodic motions of the remaining input elements with said irregular motions to produce a plurality of highly irregular intermediate motions, and means for combining said intermediate motions to produce a substantially aperiodic output motion.

6. Means for converting periodic mechanical motion to random mechanical motion comprising a common driving source of periodic motion; a plurality of input cam assemblies; each of said input cam assemblies including a plurality of input profile cams mounted for rotation with a plurality of respective camshafts, means supporting said camshafts for rotation about a common axis, a cam follower common to said plurality of input profile cams, and means supporting said cam follower in cooperative relation with said input profile cams for instantaneous actuation by whichever of said input profile cams has the largest instantaneous radius between said follower and said common axis; respective gear trains connecting each of the respective camshafts of said cam assemblies to said common driving source for rotating each of said cams at a different angular velocity; a plurality of differential motion combining means each having a plurality of input gears and an output gear; respective motion transmitting means connecting one input gear of each respective motion combining means in driving relation with a respective cam follower; additional motion transmitting means connecting the remaining input gears of said motion combining means to said common driving source; an output cam assembly having a plurality of output profile cams mounted for rotation with a plurality of respective camshafts, means supporting said camshafts for rotation about a common axis; motion transmitting means connecting each respective camshaft of said output cam assembly with the output gear of a respective differential motion combining means; and output means including an output cam follower for said output cam assembly.

7. Means for deriving a random mechanical output motion from a periodic mechanical input motion comprising a source of periodic motion, a plurality of first stage cam assemblies, each of said cam assemblies including a plurality of profile cams mounted for rotation about a plurality of respective shafts, a plurality of cam followers each common to the plurality of cams of an assembly, means supporting said cam followers each in cooperative relation with its associated assembly for actuation at any instant by at least one of said cams, respective gear trains connecting each of the respective cam shafts of said cam assemblies to said source of periodic motion for rotating each of said cams at a different angular velocity, a second stage cam assembly including a plurality of profile cams and common cam follower therefor, respective motion transmitting means connecting said latter profile cams in driving relation with said first mentioned first stage cam followers, and a single output means to produce output motion from said second stage cam follower.

8. Means for deriving a random mechanical output motion from a periodic mechanical input motion comprising a source of periodic motion, a plurality of first stage cam assemblies, each of said cam assemblies including a plurality of profile cams mounted for rotation with a plurality of respective shafts, a plurality of cam followers each common to the plurality of cams of an assembly, means supporting said cam followers each in cooperative relation with its associated assembly for actuation at any instant by at least one of said cams, respective gear trains connecting each of the respective cam shafts of said cam assemblies to said source of periodic motion for rotating each of said cams at a different angular velocity, a plurality of single cam-and-follow sets one for each said first stage cam assembly driven by said source, a first group of differential gear mechanisms one for each said single cam-and-follower set having one input gear connected in driving relation with the cam follower of its respective set, a second input gear driven by said source and an output gear element, a second group of differential gear mechanisms one for each said first stage cam assembly having one input gear connected in driving relation with the cam follower of its respective cam assembly and another input gear connected in driving relation with the output gear of one of said first set of differential gear mechanisms, an output gear for each second group differential gear, a second stage cam assembly including a plurality of profile cams and common cam follower therefor, respective motion transmitting means connecting said latter profile cams in driving relation with respective output gears of said second group of differential gear mechanisms, and a single output means connected in driving relation with the cam follower of said second stage cam assembly.

References Cited by the Examiner
UNITED STATES PATENTS

| | | | |
|---|---|---|---|
| 1,339,643 | 5/1920 | Barr et al. | 74—394 |
| 1,765,713 | 6/1930 | Boland | 74—55 |
| 1,784,902 | 12/1930 | Maurais | 74—55 |
| 2,211,148 | 8/1940 | Moore et al. | 74—1 |
| 2,222,551 | 11/1940 | Ziebolz et al. | 74—1 |
| 2,392,349 | 1/1946 | Webb | 74—394 |
| 2,547,634 | 4/1951 | Faustini | 74—394 |

MILTON KAUFMAN, *Primary Examiner.*

SAMUEL SPINTMAN, JAMES L. BREWRINK, SAMUEL BOYD, ARTHUR M. HORTON, *Examiners.*

R. F. STAHL, *Assistant Examiner.*